July 27, 1965  D. ALTENPOHL  3,197,347
TREATMENT OF ALUMINUM FOIL FOR ELECTROLYTIC CAPACITORS
Filed Dec. 11, 1962
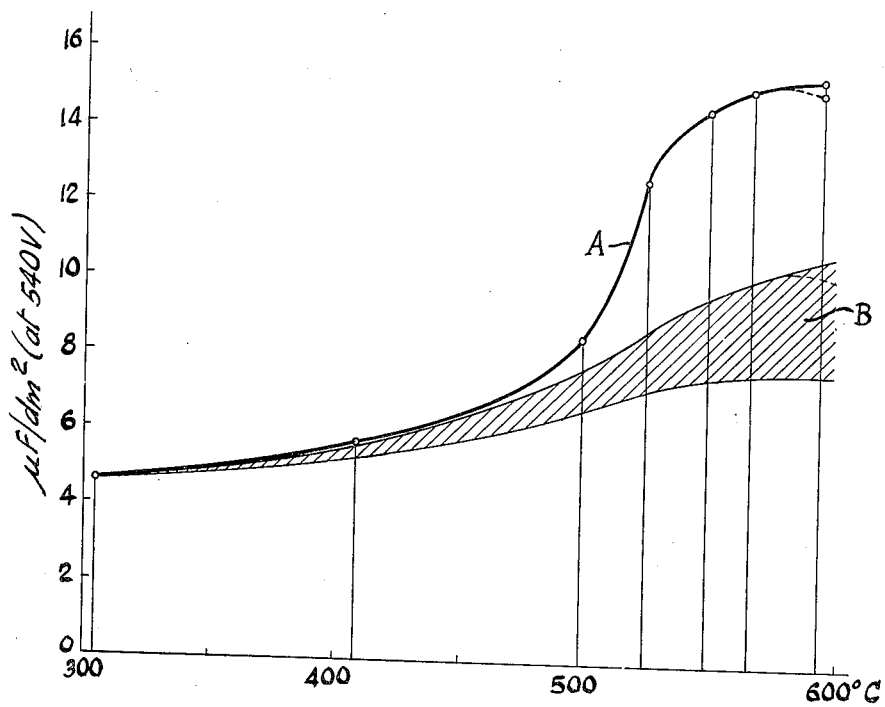
INVENTOR:
DIETRICH ALTENPOHL
BY
Morrison, Kennedy, & Campbell
ATTORNEYS.

United States Patent Office 3,197,347
Patented July 27, 1965

3,197,347
TREATMENT OF ALUMINUM FOIL FOR ELECTROLYTIC CAPACITORS
Dietrich Altenpohl, Feldmeilen, Zurich, Switzerland, assignor to Swiss Aluminium Ltd., Chippis, Switzerland, a company of Switzerland
Filed Dec. 11, 1962, Ser. No. 243,857
Claims priority, application Switzerland, Dec. 14, 1961, 14,450/61
8 Claims. (Cl. 148—20.3)

The present invention relates to a process for treating aluminum foil for electrolytic capacitors prior to etching.

By annealing aluminum foil, improved results are obtained when it is subsequently etched for use in an electrolytic capacitor. The extent to which the foil is roughened increases slowly as the annealing temperature is increased above 500° C., and then increases more rapidly after annealing at temperatures from 560° C. upwards.

It has been proposed that aluminum foil with a recrystallization texture (001) [100] and with an etched surface should be used for electrolytic capacitors. Such a texture, which can be achieved using 99.99% pure aluminum foil and which yields on etching the highest possible increase in surface area, may be obtained, for example, by annealing a 100μ thick hard foil for 48 hours at 560° C. or for 10 hours at 600 to 630° C. By hard foil is meant a foil which has a hardness such as that obtained by cold-rolling.

It has been found in accordance with the present invention that the increase in surface area obtained upon etching substantially pure aluminum foil can be increased still further by annealing the foil before etching at a temperature above 500° C. not in air, but in a gas which is substantially inert to the foil. By "substantially pure aluminum" is meant aluminum that is at least 99.8% pure.

It has also been found in accordance with the present invention that in order to insure good results, the aluminum foil must be thoroughly degreased before annealing. It has been determined in accordance with the present invention, that if a foil which has not been degreased is annealed, the grease or oil is partly volatilized at high temperature and is also partly decomposed, leaving a film of carbon black on the surface of the foil. This film is oxidized in the presence of oxygen, if the annealing occurs in normal atmosphere, and remains on the surface of the foil in the absence of oxygen, when the annealing is done in the presence of inert gas, in accordance with the present invention.

The inert gas has an oxygen content of less than 5% by weight and preferably less than 0.5% by weight and a dew-point below 10° C. and preferably below 0° C. A suitable inert gas may be nitrogen or carbon dioxide or a mixture thereof or may be a dried combustion gas, containing by weight, for example, 9–15% $CO_2$, 0–3% $H_2$, 0–3% CO, and the remainder $N_2$, and produced by the combustion of butane or some other fuel gas. The foil is maintained above 500° C. desirably for from 10 to 100 minutes in the presence of the inert gas.

The accompanying diagram is a curve showing by way of example the increase in surface area which may be obtained by the process according to the present invention. In this diagram, there are shown the capacity values (in $\mu F/dm.^2$ at 540 volts) obtained after the aluminum foil has been subjected to the steps of degreasing, annealing at different temperatures, electrolytic etching and forming of a dielectric oxide layer thereon, using aluminum foil which has high purity (99.99%) and a thickness of about 80μ.

Curve A shows the capacity values which were obtained after annealing in an inert gas containing less than 0.2% oxygen and having a dew-point below 5° C. By way of comparison, the region B shows the capacity values which were obtained by annealing the aluminum foil in air in a conventional manner.

In all cases, annealing was carried out by heating the aluminum foil up at a rate of 20° C./hour to the stated annealing temperature, maintaining the annealing temperature for 30 minutes and then cooling the foil at a rate of 20–50° C./hour.

After annealing in each case, the foil was electrolytically etched with direct current to such an extent in an 8% solution of sodium chloride at 75° C. with a current density of $23 A/dm.^2$, that the foil lost 30% in weight.

The dielectric oxide layer was formed in each case in a solution containing 100 g. boric acid and 1 g. borax in each litre of double-distilled water at 90° C. with direct current having an approximately constant intensity of about 40 $mA/cm.^2$ and a potential increasing up to 540 v. between sample and cathode, the forming time being 5–10 minutes depending on the specimen charging rate. In a further step of formation, the charging was continued at a constant potential of 540 v. during about 15 minutes with some interruptions, until the corresponding decreasing current intensity had reached asymptotically its lowest value.

The diagram shows that at temperatures above 500° C. compared with conventional annealing in air, annealing in an inert gas was accompanied by a substantial increase in capacity values, to an extent of 3 to 4μ $F/dm.^2$, i.e. an increase of about 25 to 35%. It was also found unexpectedly, that with certain qualities of aluminum, there is a maximum to the capacity values, which may be obtained at an annealing temperature of 550 to 590° C., and that after annealing at higher temperatures, lower capacity values result.

The aluminum foil treated as described is incorporated into an electrolytic capacitor in the manner well known in the art.

While the invention has been described with particular reference to a specific embodiment, it is to be understood that it is not to be limited thereto but is to be construed broadly and restricted solely by the scope of the appended claims.

What is claimed is:

1. The process of treating substantially pure aluminum foil for electrolytic capacitors prior to etching, which process comprises the steps of degreasing the foil and then annealing the foil at a temperature of at least 500° C. in a gas which is substantially inert to the foil.

2. A process as described in claim 1, wherein the foil is annealed in a gas having an oxygen content of less than 5% by weight and a dew-point below 10° C.

3. A process as described in claim 1, wherein the foil is annealed in a gas having an oxygen content of less than 0.5% by weight and a dew-point below 0° C.

4. A process as described in claim 1, wherein the foil is maintained above 500° C. for from 10 to 100 minutes.

5. A process as described in claim 1, wherein annealing is carried out at a temperature of 550 to 600° C.

6. A process as described in claim 1, wherein subsequent to the annealing step, the foil is subjected to the steps of electrolytic etching, forming a dielectric oxide film on its surface and incorporating the foil into an electrolytic capacitor.

7. The process of treating substantially pure aluminum foil for electrolytic capacitors comprising the steps of annealing the foil at a temperature of at least 500° C. in a gas which is substantially inert to the foil and then subjecting the annealed foil to electrolytic etching to form a dielectric oxide film on its surface.

3. The process as described in claim 1, wherein the foil is substantially free from grease before being subjected to annealing treatment.

References Cited by the Examiner

UNITED STATES PATENTS

| | | | |
|---|---|---|---|
| 2,506,364 | 5/50 | Jarvie et al. | 148—20.3 |
| 2,699,382 | 1/55 | Altenpohl | 41—42 |
| 2,886,432 | 5/59 | Schmitt et al. | 75—138 |
| 3,061,485 | 10/62 | Robinson | 148—13.1 |
| 3,084,080 | 8/63 | Hunter et al. | 148—20.3 X |

FOREIGN PATENTS 494,274  10/38  Great Britain.

DAVID L. RECK, *Primary Examiner.*